United States Patent Office 3,616,605
Patented Nov. 2, 1971

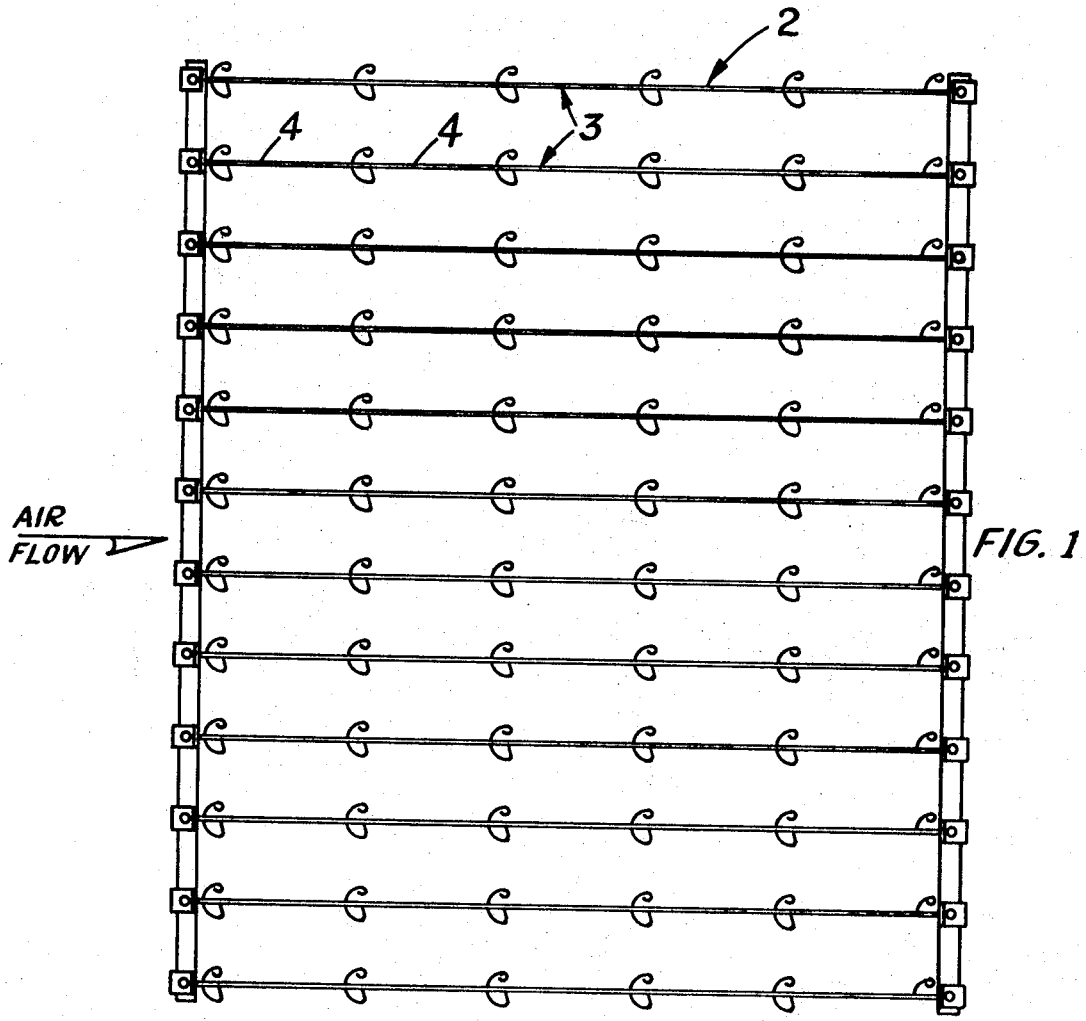
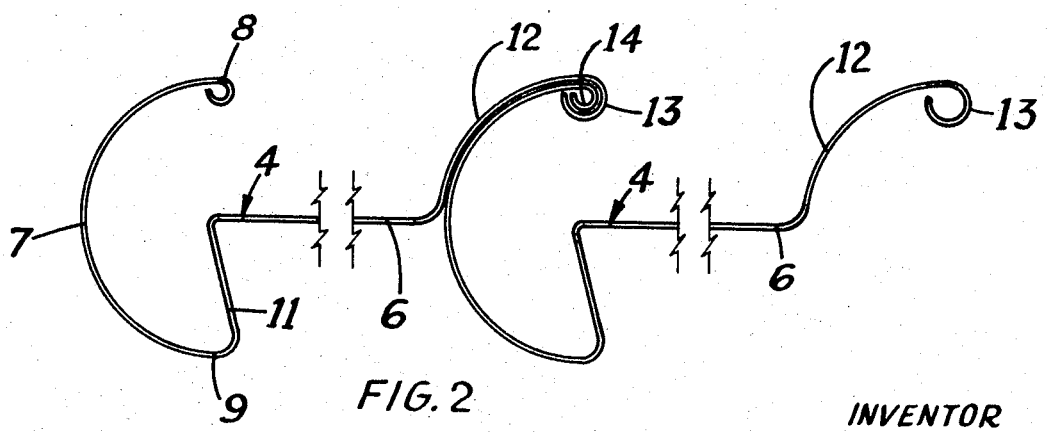

3,616,605
COLLECTING ELECTRODE PLATE ASSEMBLY
George D. Krause, Somerville, N.J., assignor to American Air Filter Company, Inc., Louisville, Ky.
Filed July 2, 1969, Ser. No. 838,446
Int. Cl. B03c *3/00*
U.S. Cl. 55—130            1 Claim

ABSTRACT OF THE DISCLOSURE

A collecting electrode plate assembly wherein each collecting electrode is made up of aligned sections, each section including a generally flat planar central body portion, a semicircular baffle leading edge portion, and a quarter circular baffle trailing edge portion, the trailing edge portion of one section nesting with the leading edge portion of a successive adjacent similar section.

BACKGROUND OF THE INVENTION

In electrical precipitation, dust particles are removed from a gas stream by electrically charging the particles with electrons and drawing them to grounding collecting electrodes under the influence of the strength of the electrical field. The performance efficiency of the precipitator is directly related to the construction and characteristics of the electrode plates with one of the desiderata of construction being to prevent re-entrainment of particulate materials. To accomplish this, many of the collecting electrode plates of the past have required a relatively large number of pieces which have been fastened together and which, because of their very size and shape, have presented problems in alignment and stability, being both costly and difficult in construction and maintenance.

SUMMARY OF THE INVENTION

In accordance with the present invention, a collecting electrode plate assembly is provided which is comprised of a plurality of identical sections readily assemblable in an economic fashion to provide a stable, efficient construction which permits quiescence adjacent the plates to prevent re-entrainment of particulate materials collected thereon.

Various other features of the present invention will become obvious to one skilled in the art upon reading the disclosure set forth hereinafter.

More particularly, the present invention provides a collecting electrode plate assembly for an electrostatic precipitator comprising a plurality of laterally spaced similar collecting electrodes, each collecting electrode including several similar sections extendng in successive alignment, each section comprising a flat central portion extending substantially parallel the direction of gas flow, a leading edge baffle portion of semicircular cross section extending transverse the direction of gas flow with the extremities thereof in opposed spaced relation on either side of the central portion, the baffle portion being joined to the central portion by a sole base leg portion extending between an extremity of the baffle portion and the leading edge of the central portion, the other extremity of the baffle portion being free, and a trailing edge baffle portion of quarter circular cross section extending from the trailing edge of the central portion transverse the direction of gas flow, the trailing edge baffle portion being sized to nest with the leading edge baffle portion of the next successive electrode section.

It is to be understood that various changes can be made in the arrangement, form and scope of the present disclosure without departing from the scope or spirit of the present invention.

Referring to the drawing which discloses one advantageous embodiment of the present invention:

FIG. 1 is a top plan view of a collecting plate electrode construction in accordance with the present invention; and FIG. 2 is an enlarged view of a portion of a collecting electrode of the electrode assembly of FIG. 1.

As can be seen in FIG. 1 of the drawing, the collecting electrode plate assembly 2 is comprised of a plurality of laterally spaced similar collecting electrodes 3 with each collecting electrode including several similar sections 4 extending in successive alignment. It is to be understood that the sections can be formed from flat solid sheet plate material or can be perforated, corrugated, dimpled or otherwise indented without departing from the spirit of the present invention.

Advantageously, each section 4 is formed from an integral sheet and includes a flat central portion 6 extending substantially parallel the direction of gas flow. Positioned at the leading edge of each central portion 6 is a leading edge baffle portion 7 of semicircular cross section. Baffle portion 7 is arranged to extend transverse the direction of gas flow with the extremities 8 and 9 thereof in opposed spaced relation on either side of flat central portion 6. It is to be noted that each of extremities 8 and 9 is in the form of a soft curve, such curve allowing for a certain tolerance in alignment between adjacent plates without disturbing the desired quiescence of flow between plates. Leading edge baffle portion 7 is joined to flat central portion 6 by a sole base leg portion 11 which extends in a sloping upstream manner between extremity 9 of the baffle portion 7 and the leading edge of central portion 6. The other extremity 8 of the baffle portion is free.

As can also be seen in FIG. 2 of the drawing, positioned at the trailing edge of central portion 6 of each plate is trailing edge baffle portion 12 of quarter circular cross section, such trailing edge portion 12 being joined at its leading edge to and extending from the trailing edge of central portion 6 transverse the direction of gas flow in a manner similar to leading edge portion 7. Trailing edge portion 12 is to sized as to next with leading edge baffle portion 7 of the next successive electrode section, trailing edge baffle portion 12 being positioned on the same side of central portion 6 as the free extremity 8 of the leading edge baffle portion so as to permit ready assembly of sections 4 and provide a stable structure. To further enhance the over-all stability of the collecting electrode plate arrangement, it will be noted that the trailing edge baffle portion 12 is provided with a turn 13 which engages with turn 14 of the leading edge baffle portion 7 to form a nesting rib.

With the arrangement abovedescribed, it can readily be seen that the collecting electrode plate assembly of the present invention minimizes misalignment and maximizes stability, providing maximum efficiency with a minimum of parts and a minimum of construction effort.

The invention claimed is:

1. A collecting electrode plate assembly for disposition in a flow-through housing of an electrostatic precipitator comprising a plurality of laterally spaced similar collecting electrodes, each collecting electrode including several similar sections disposed in a common plane and extending in successive alignment, each section comprising a flat central portion positioned to extend substantially parallel the gas flow through said housing, a leading edge baffle portion of semicircular cross section configuration extending transverse the gas flow with the extremities thereof in opposed spaced relation on either side of said central portion, said baffle portion being joined to said central portion by a sole base leg portion extending between an extremity of said baffle portion and the leading edge of said central portion, the other extremity of said baffle portion being free, and a trailing edge baffle portion of quarter circular cross section configuration extending from said trailing edge of said central portion transverse the direction of gas flow, said trailing edge baffle portion nesting with the leading edge baffle portion of the next successive electrode section; said trailing edge baffle portion being positioned on the same side of said central portion as said free extremity of said leading edge baffle portion; said extremities of said baffle portions being curved to enhance alignment; said free extremity of said leading edge baffle portion and the extremity of said trailing edge portion being turned to form a nesting rib between nesting sections.

References Cited

UNITED STATES PATENTS

| | | | |
|---|---|---|---|
| 520,371 | 5/1894 | Mullins | 52—520 |
| 1,975,043 | 9/1934 | Hoffmann | 52—520 |
| 2,178,415 | 10/1939 | Ansel | 52—520 |
| 2,812,035 | 11/1957 | Sohlman et al. | 55—130 X |
| 3,127,962 | 4/1964 | James | 160—235 X |
| 3,282,029 | 11/1966 | Stevernagel | 55—154 X |
| 3,289,365 | 12/1966 | McLaughlin et al. | 52—521 X |
| 3,402,526 | 9/1968 | Baxter | 55—156 |
| 3,418,792 | 12/1968 | Quintilian et al. | 55—156 |

FOREIGN PATENTS 1,133,582   11/1956   France.

DENNIS E. TALBERT, JR., Primary Examiner

U.S. Cl. X.R.

55—140, 156